United States Patent
Siegel et al.

(10) Patent No.: US 7,046,987 B2
(45) Date of Patent: May 16, 2006

(54) FINDING CELL PHONES IN RUBBLE AND RELATED SITUATIONS

(75) Inventors: Neil G. Siegel, Rancho Palos Verdes, CA (US); Stephen D. Stearns, Los Altos, CA (US); Anthony G. Jennetti, Sunnyvale, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 440 days.

(21) Appl. No.: 10/266,807

(22) Filed: Oct. 8, 2002

(65) Prior Publication Data

US 2004/0198381 A1    Oct. 7, 2004

(51) Int. Cl.
*H04M 11/04* (2006.01)

(52) U.S. Cl. .............. 455/404.2; 455/404.1; 455/456.5; 342/463; 342/450

(58) Field of Classification Search ............ 455/404.2, 455/404.1, 456.5, 456.1, 422.1; 342/357.12, 342/463, 450; 375/346, 347, 439
See application file for complete search history.

(56) References Cited

U.S. PATENT DOCUMENTS

| | | | | |
|---|---|---|---|---|
| 5,959,966 A | * | 9/1999 | Torkkola | 370/203 |
| 6,246,674 B1 | * | 6/2001 | Feuerstein et al. | 370/334 |
| 2002/0021621 A1 | * | 2/2002 | Haase et al. | 367/118 |
| 2002/0068569 A1 | * | 6/2002 | Chen et al. | 455/437 |
| 2002/0172308 A1 | * | 11/2002 | Harel et al. | 375/347 |
| 2002/0183269 A1 | * | 12/2002 | Southan et al. | 514/44 |
| 2002/0193941 A1 | * | 12/2002 | Jaeckle et al. | 701/207 |
| 2002/0196840 A1 | * | 12/2002 | Anderson et al. | 375/130 |
| 2003/0139141 A1 | * | 7/2003 | Marjamaki et al. | 455/67.1 |

* cited by examiner

*Primary Examiner*—Danh C. Le
(74) *Attorney, Agent, or Firm*—Tarolli, Sundheim, Covell & Tummino L.L.P.

(57) ABSTRACT

Systems and methods are provided for locating a transmission signal from a radio transmission emitter device, such as a cell phone, in a rescue area. A pilot signal is employed to lock onto a transmission signal of one or more radio transmission devices located in a rescue area. A signal separation routine extracts desired transmission signals from emitter devices located in the rescue area from other signals coexisting on similar frequency bands and interfering with the desired transmission signals. An estimated location of transmission signals from emitter devices located in the rescue area is determined based on one or more transmission signal location techniques. The area is searched based on the estimated location of the transmission signal. If the emitter transmitting the transmission signal is not found, devices in the system are moved and the location estimation is repeated.

24 Claims, 8 Drawing Sheets

FINDING CELL PHONES IN RUBBLE AND RELATED SITUATIONS

TECHNICAL FIELD

The present invention relates to communications and, more particularly, to systems and methods for locating a radio transmission emitter device.

BACKGROUND OF THE INVENTION

In certain applications it is desirable to determine the location of an emitter (e.g., cell phone) of a radio transmission signal. Precise location information in a cellular telephone network is desirable for various reasons. Location information can be employed to aid hand-off, increase signal sensitivity, reduce co-channel interference and increase cell capacity. Additionally, location information is utilized in 911 dispatching, tracking unauthorized cell phone usage, and tracking or locating commercial and government vehicles. The FCC has required that Phase I of a wireless emergency 911 system (E-911) provide a 911 agent (a Public Safety Answering Point) with caller number and cell site location, while phase II of the E-911 system requires that caller latitude and longitude with an error radius of not more than 125 meters be provided. These techniques are designed to locate a cell phone to a building, but cannot give the location of the cell phone within the building (e.g., within a room). Therefore, current E-911 system techniques are not precise enough to locate a cell phone in a search and rescue operation. Additionally, current techniques proposed to locate cell phones assume that a cell phone is in use and has an active link with a cell tower.

Another problem with locating cell phones with high precision is due to multipath. Multipath is caused by the reflection of signals from objects in the environment, such as buildings, hills and other structures. A signal transmitted from a cellular phone can result in many multipath signals arriving at a base station in addition to a direct path signal. Therefore, signals from a phone can appear to arrive from multiple directions and at different times from a main signal. Another source of impairment is additive noise or interference from other cellular phones and base stations. For example, many cellular systems transmit signals on the same frequencies and time slots. The Code Division Multiple Access (CDMA) standard employs the same set of frequencies at each cell, while other systems reuse each frequency within certain geographical constraints. Therefore, it is difficult to detect a weak signal, for example, in a pile of rubble, amongst the other interfering signals due to multipath and other cell phone signals within the same frequency range.

As the events of 11 Sep. 2001 have demonstrated, there exists today no practical method to locate quickly and accurately a cell phone or other radio transmitter in a pile of building rubble. Such quick and accurate location estimates could guide rescue efforts and thereby save lives. Various attempts to solve some of these problems using Global Position System (GPS) technology have been made, but fail for various reasons. For example, most of today's cell phones have no capability to receive GPS signals. Additionally, GPS signals are too weak to be received inside most buildings, and location estimates derived from GPS signals received inside buildings have greatly degraded accuracies due to multipath reflections. Even under the best conditions, GPS fundamentally does not provide the location accuracy required for rescue operations.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to systems and methods for locating transmissions signals from an emitter device (e.g., a cell phone) residing in a rescue area. The rescue area can be underneath a collapsed building or bridge, inside a room or building, in a collapsed cave, underneath snow in an avalanche, or any of a variety of other rescue scenarios. The systems and methods include disposing receivers around or within a rescue area, and illuminating the rescue area with one or more pilot signals. The one or more pilot signals provide a connection link for one or more emitter devices in the rescue area. The pilot signals can also capture control of the emitter device from a current connection (e.g., a cell tower). In one aspect of the invention, the pilot signals include transmitting signals in one or more frequency bands in a plurality of different wireless standards. The pilot signals can be stepped through the different frequency bands in frequency sets to minimize transmission time of all the frequency bands. The receivers receive responses from emitter devices id the rescue area in addition to other signals within the same frequency bands. A signal separator is provided to separate desired signals from interfering signals in the same frequency band as the desired signals. The signal separator can be a cochannel processing algorithm, or some other processing algorithm for removing interfering signals.

A direction finding routine can be employed at one or more receivers to determine a general direction of a transmitting signal of an emitter device. The direction finding routine can employ directional antenna arrays and direction finding algorithms to determine a transmission signal direction. The direction finding routine can be a direction-of-arrival (DOA) routine. The direction finding data from one or more receivers is provided to a signal estimation locator. The signal estimation locater can reside at a master control unit or a master receiver. The signal estimation locator receives signal data from one or more receivers, and determines an estimated location of one or more emitter devices located in the rescue area by using the received signal data and geographical position information of the receivers disposed in or around the rescue area. The signal estimation locator can also employ the direction finding data in determining the estimated location or locations. The signal estimation locator can alternatively employ a time-difference-of-arrival technique to determine the estimated location or locations with or without direction of arrival information from the receiver. A variety of triangulation or trilateration techniques can be employed to determine the estimated location or locations. The area can be searched and the process repeated to refine the estimates if the emitter devices are not located.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will

DETAILED DESCRIPTION OF INVENTION

The present invention provides for systems and methods for locating a radio transmission signal in a rescue operation. Receivers are located around the rescue area to monitor for transmission signals from the one or more radio transmission emitter devices (e.g., cell phones). A calibration routine is executed to determine geographical position information of the receivers. A base station pilot signal is employed for connecting with the radio transmission devices located in a rescue area. A signal separation routine extracts desired transmission signals from other signals coexisting on similar frequency bands and interfering with the desired transmission signals. A direction finder algorithm can be employed to determine at each receiver location the direction from which one or more of the desired transmission signals are being transmitted. The direction data, raw signal data and receiver position data are provided to a master controller to determine an estimated location of the transmission signal employing a signal estimation location routine. The area is searched based on the estimated location of the transmission signal. During the search, the receivers and/or base station can be moved and the location estimation routine repeated to improve the accuracy of the location estimates. Alternate location estimation routines can be employed to estimate or locate a radio transmission emitter device because different wireless standards provide different data (e.g., range data for trilateration) inherently.

The present invention will be illustrated with respect to locating a cell phone signal in a pile of rubble. However, the present invention is applicable to other rescue situations and other radio transmission or emitter devices. For example, tracking friendly and potentially enemy units in a military operation in urban terrain, such as units in street-to-street and room-to-room fighting. Tracking police operations inside a building in real-time such as, for example, during a raid of a house or room. Counter-drug operations by groups such as the Drug Enforcement Agency (DEA) and the Federal Bureau of Investigations (FBI), for example, during a raid of a room or warehouse. Real-time tracking of fire fighters and other rescue personnel (e.g., paramedics) when entering a building during a fire or suspected fire. Additional applications can include rescue operations of locating miners trapped in mines, spelunkers lost in caves, and skiers buried in avalanches.

Figure 1:
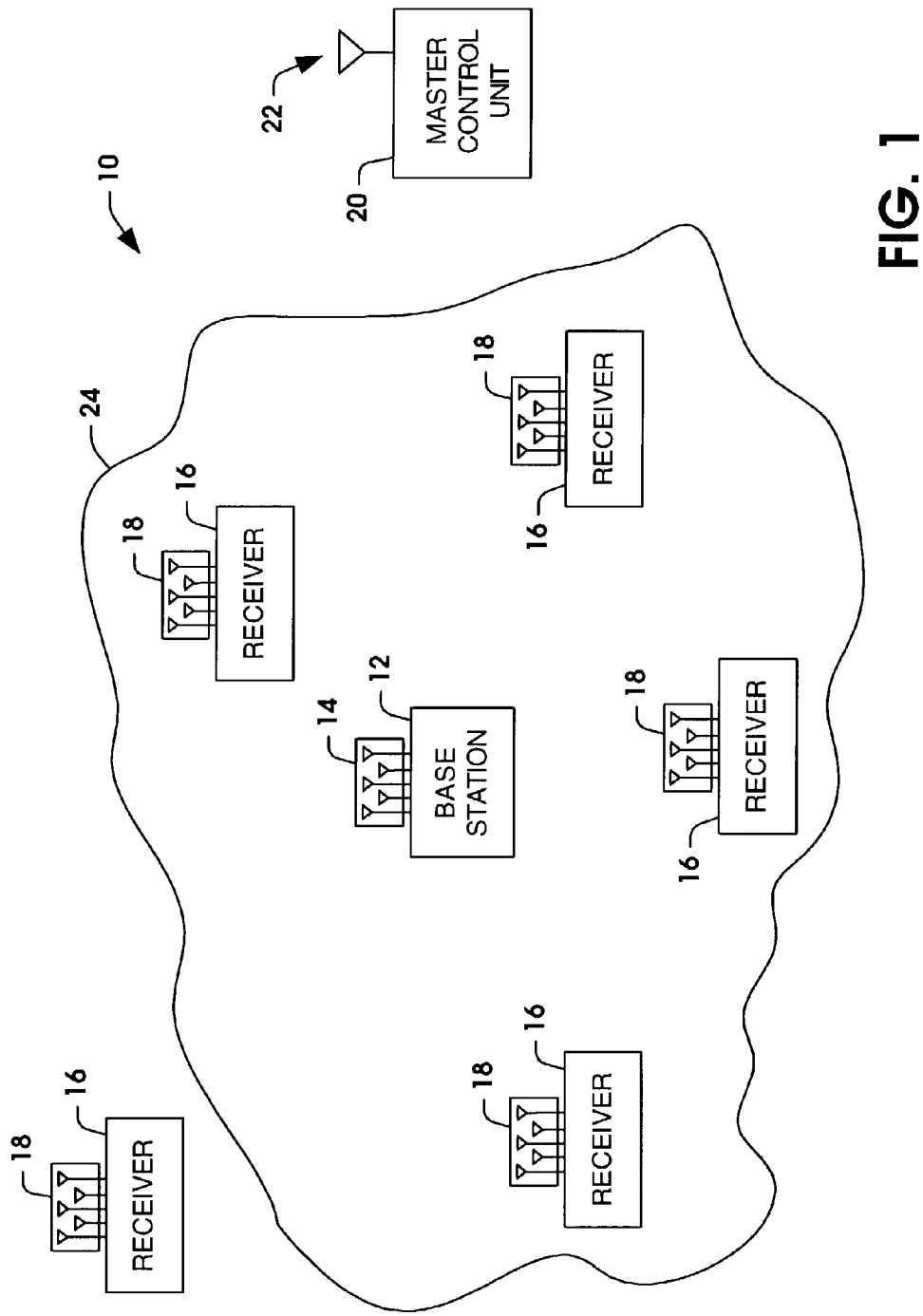
FIG. 1 illustrates a block diagram of a transmission signal location system in accordance with an aspect of the present invention.

FIG. 1 illustrates a transmission signal location system 10 in accordance with an aspect of the present invention. The transmission signal location system 10 includes a base station 12, a plurality of slave receiver devices 16 and a master control unit 20. The base station 12 includes an antenna array 14 and each slave receiver device 16 includes an antenna array 18. The antenna arrays 14 and 18 allow for signal direction determination to be made at the individual base station 12 and/or receiver 16, for example, employing smart antenna technology. An antenna array can cooperate with a processing algorithm to perform a direction-of-arrival (DOA) calculation that provides a general indication of a direction from which one or more transmitter signals originate. The antenna array can include one or more directional antennas, such as a directional yagi-type antenna, a dish type antenna, or some other directional or omni-directional type antenna. Additionally, cryogenic amplifiers can be employed to amplify the received signal at the antennas. The master control unit 20 includes a single antenna 22 for transmitting command information and or receiving transmission signal and device position information from the receivers 16 and the base station 12.

A user places the base station 12 in a generally central region of a rescue area 24. The receivers 16 are placed around the base station 12 within the rescue area 24 and/or along the outer region of the rescue area 24. It is to be appreciated that the base station placement and receiver placement will be at least partially dependent on the terrain of the rescue area 24. After a desired placement of the base station 12 and receivers 16 are completed, the geometry of the receivers is determined by a calibration process. The master control unit 20 invokes a calibration routine to initiate calibration of the base station 12 and receivers 16. The calibration routine includes determining geographical position information of the base station 12 and the receivers 16 with respect to one another. The geographical position information can be determined employing GPS techniques, laser ranging finding techniques or manual entry of the geographical coordinates of the base station 12 and the receivers 16.

The base station 12 then transmits a plurality of strong pilot signals in the direction of the rescue area 24. The pilot signals simulate a cell tower, and cause cell phones to handoff or transfer control from connected cell towers to the base station 12. For example, if it is desired to locate one or more cell phones and/or one or more cell phone types in a pile of rubble, the base station 12 can transmit a plurality of frequency band signals. In one aspect of the invention, the base station 12 is operative to transmit frequency bands of the cellular/PCS air-interface standards in the 800 MHz cellular, 1,900 MHz PCS, and SMR bands, as well as future 3 G spectrum that the FCC is defining. The base station 12 can illuminate the rubble with a strong pilot signal in the 800 MHz cellular (and in the PCS, SMR, and other) bands, giving buried cell phones something to connect to, or transfer signal lock and control away from local commercial service should it be present. The base station 12 is universal in the sense that it supports all air-interface standards concurrently. In one aspect of the invention, the base station 12 is implemented as a software defined radio.

The most difficult situation occurs in the case where the medium to be penetrated consists of a mixture of dielectric and conducting rubble as would be the case in the event of a building collapse. The presence of random lengths of steel, girders, supports, rebar, and wire complicates radio signal propagation and degrades location estimation. In order to mitigate resonances and obtain frequency diversity, the base station 12 can command a cell phone to handoff to different frequencies. The phone can be stepped through the band by means of a series of handoffs (five handoffs for IS-95 CDMA phones; 125 for GSM; 832 for IS-95 TDMA; and 600 for Nextel/iDEN). This frequency stepping improves resolution and location accuracy by providing frequency diversity.

In some standards, for example CMDA, the cell phone will not connect to the base station 12, unless the base station 12 is transmitting at the same frequency as the cell tower that the phone is connected. In this situation, the base station 12 will step through all the frequencies of the desired system to connect to the cell phone. The time for stepping through the frequencies can be further improved by transmitting sets of frequencies, so as to transmit all frequencies of all desired phone types within a desirable time limit (e.g., 1 minute).

The plurality of receivers 16 monitor transmission signal responses to the pilot signals as the pilot signals are being transmitted. The receivers 16 include a signal separation routine that removes interfering signals from the desired cell phone signals. The interfering signals can include other cell phone signals within and around the rescue area 14 in addition to other interfering signals within the same frequency and/or time slot. The signal separation routine can be a number of different signal separation routines. One example is the "TRW Firestorm eCURE algorithm" disclosed in U.S. Pat. No. 6,018,317, entitled "COCHANNEL SIGNAL PROCESSING SYSTEM", incorporated by reference herein. The TRW Firestorm eCURE algorithm compensates for multipath effects of transmitted signals.

Firestorm eCURE is a blind array signal processing algorithm that separates and recovers multiple cochannel signals. The signals are assumed to be linearly mixed such that each receiving antenna receives a different linear combination of the incident signals. The name eCURE is an acronym for eigen-cumulant recovery algorithm. The algorithm employs higher-order statistics (HOS), specifically fourth or higher order cross cumulants of the received signals. By contrast, many traditional array signal processing algorithms rely only on second order statistics (SOS), principally cross-correlation or covariance matrices of the received signals.

The essence of Firestorm eCURE is an extremely fast iterative search algorithm that finds the steering vectors of the non-Gaussian source signals. The algorithm decompose the received vector signals by finding a set of steering vectors that maximizes the auto-kurtoses of the separated source signals. The eCURE algorithm is blind to both the receiving array and the signal modulation, works with arbitrary, uncalibrated antenna array configurations, recovers the steering vectors of the non-Gaussian incident signals, and recovers steering vectors of signals having widely different amplitudes. The steering vectors estimated by the cross-cumulant iteration are passed to a standard minimum-variance distortionless response (MVDR) beamformer. Beamforming weight vectors are calculated for the recovery of each non-Gaussian source.

The eCURE algorithm is capable of separating and recovering multiple cochannel signals rapidly using array signals without knowledge of array geometry and array calibration data associated with the array antenna 18 of the receiver 16.

The eCURE algorithm can provide direction-of-arrival (DOA) parameters for each signal source if antenna array calibration data is available. The signal separation routine cooperates with the antenna array 18 to provide steering vectors that are used in separation and direction finding of a desired signal. An antenna array can be steered to transmit and receive signals to or from a desired direction.

Certain signal separation routines do not provide direction finding. A separate direction finding routine is then provided at the receiver 16 or the master control unit 20. The raw signal data and the direction finding data are then provided to a location estimation routine located at the master control unit 20. The master control unit 20 employs the data from each receiver 16 to perform a triangulation, trilateration, or time-difference-of-arrival (TDOA) routine to determine an estimated location of one or more cell phones in the rescue area 24. The rescue workers can then search the area (e.g., dig into the rubble at the estimated location) until the signal transmitter is located. If the signal transmitter is not located, the base station 12 and/or receivers 16 can be moved around the rescue area 24 and the location estimation can be repeated. It is to be appreciated that the location estimation routine can be located at a master receiver, as opposed to the master control unit 20. The location estimation information can then be transmitted to the master control unit 20 to be displayed to a user.

Figure 2:
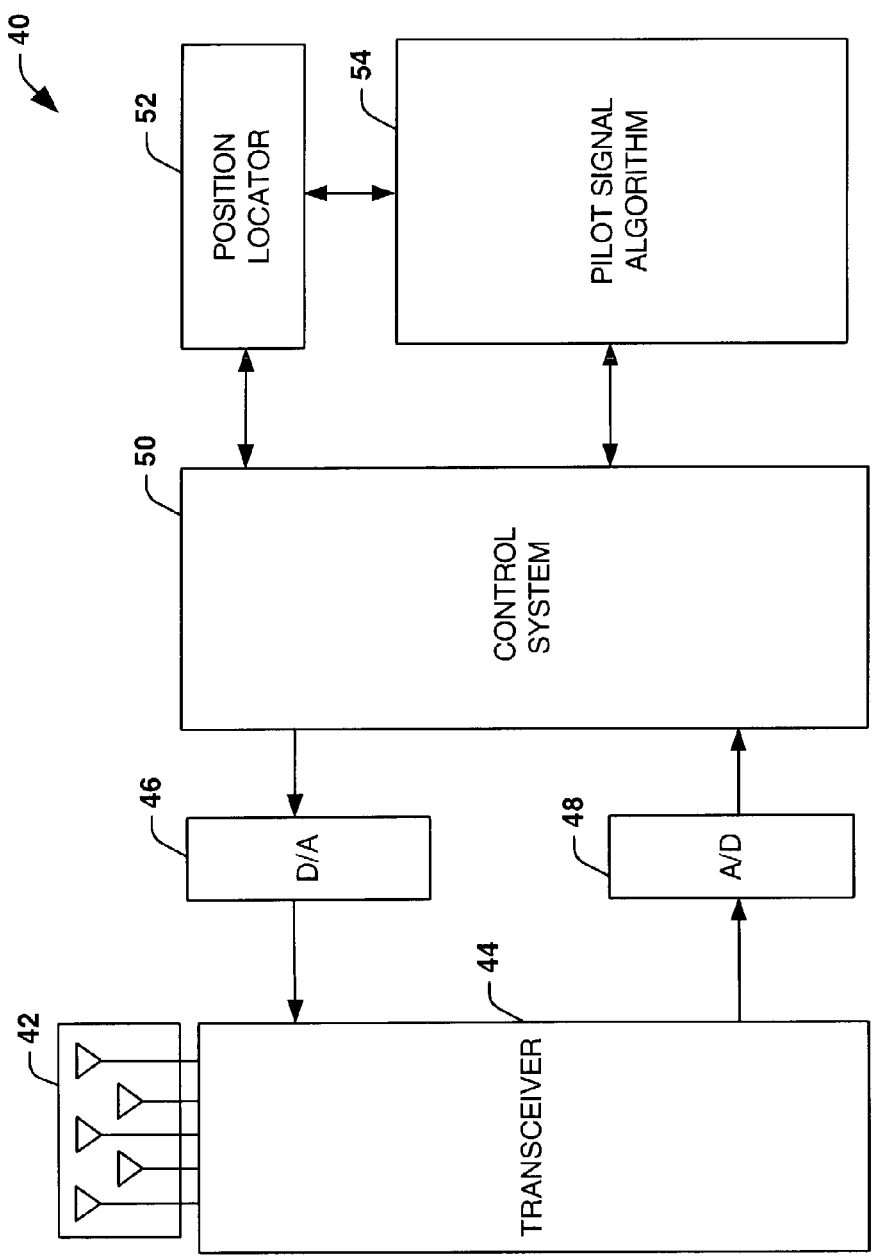
FIG. 2 illustrates a block diagram of a base station in accordance with an aspect of the present invention.

FIG. 2 illustrates a block diagram of an exemplary base station 40 in accordance with an aspect of the present invention. The base station 40 includes an antenna array 42 coupled to a transceiver 44. The transceiver 44 can include algorithms for demodulation of received data and modulation of transmitted data. The antenna array 42 and the transceiver 44 cooperate to transmit and receive radio transmission signals to and from the base station 40. Signals received by the base station are transmitted through the antenna array 42 and transceiver 44 to an analog-to-digital (A/D) converter 48. The A/D converter 48 transforms the radio signals from the analog to the digital domain prior to providing the radio signal to a control system 50. Signals transmitted from the base station 40 originate from the control system 50 and are transformed from the digital domain to the analog domain by a digital-to-analog (D/A) converter 46. The received digital data is provided to the control system 50. The control system 50 can include a processor or controller with corresponding memory for executing algorithms, or be a digital signal processor (DSP) with associated peripheral circuitry for executing algorithms. The algorithms can include extracting instructions from data, performing calibration routines, performing unit geographical position determination employing a position locator component 52 and executing a pilot signal algorithm 54.

The base station 40 employs the pilot signal algorithm 54 to transmit pilot signals in frequency bands of a variety of air-interface standards. For example, the present invention may be adapted for, but is not limited to, any of the common wireless standards, such as AMPS, NAMPS, NMT 900, TACS, ETACS, NMT 450, C-450, RTMS, JTACS, NTACS, DAMPS (TDMA, IS-54, IS-136), GSM, DCS 1800, PCS (PCS 1800 and PCS 1900), PHS, CDMA (narrowbands, widebands, 800 MHz, 1.8 GHz or 1.9 GHz), iDEN (aka MIRS), EDACS, FHMA, JDC, TETRA, APCO-25, and MPT-1327. The base station 40 illuminates the rubble with strong pilot signals giving buried cell phones something to connect to, or transferring signal lock and control away from local commercial service. The base station 40 is universal in the sense that it supports all air-interface standards concurrently. Once a cell phone is connected, it is stepped through the frequency bands of its standard by means of a series of handoffs (e.g., five handoffs for IS-95 CDMA phones; 125 for GSM; 832 for IS-95 TDMA; and 600 for Nextel/iDEN). This is done by direct command to the phone or by varying the pilot signal strengths depending on the particular standard. The time for stepping through the frequencies can be further improved by transmitting sets of frequencies, so as to transmit all frequencies of all desired phone types within a desirable time limit. The position locator component 52 can determine the geographical position information of the base station 40 with respect to other units (e.g., receivers) of the system. The position locator component 52 can employ GPS location techniques, laser range finding techniques or the like.

Figure 3:
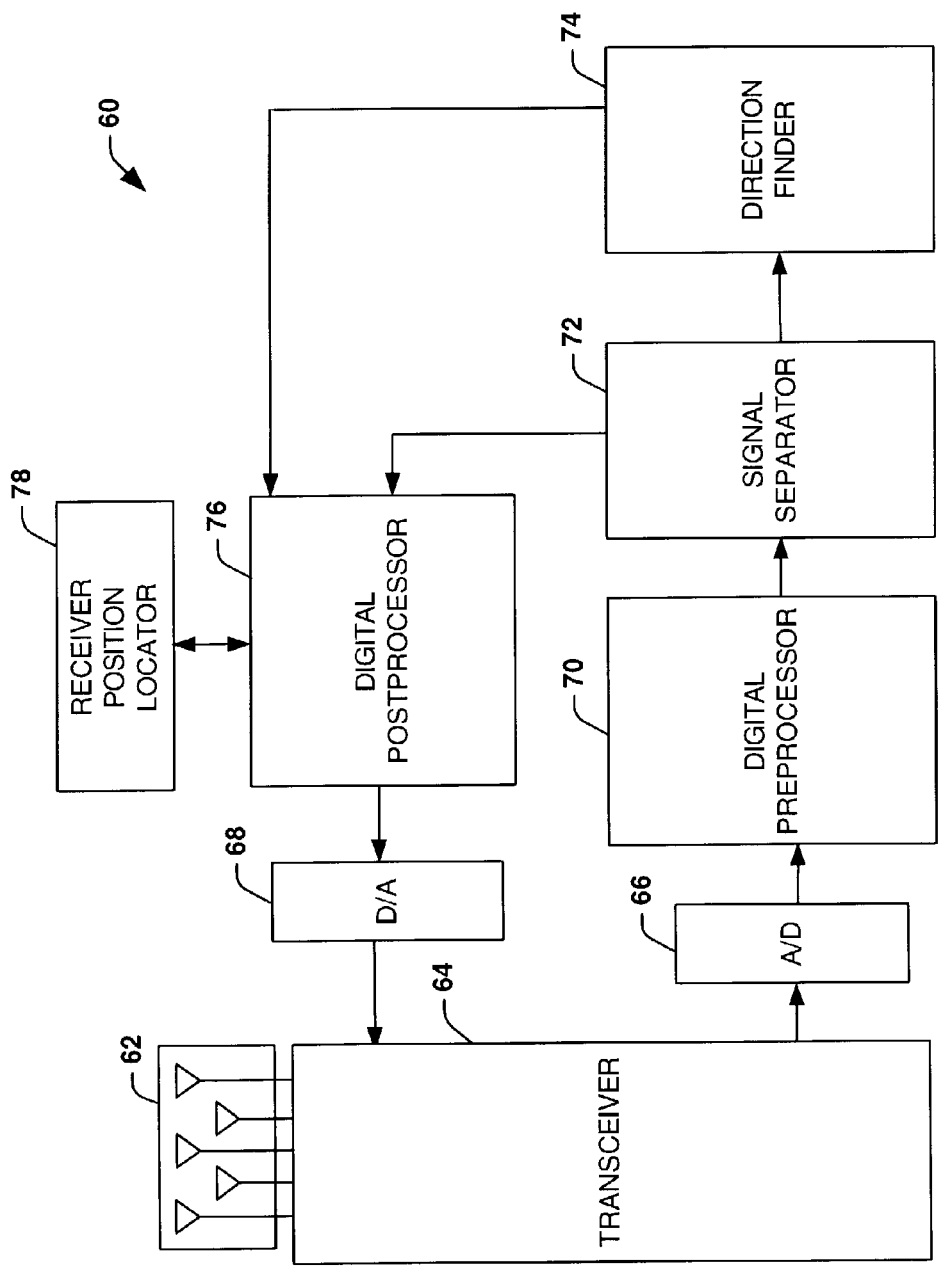
FIG. 3 illustrates a block diagram of a receiver in accordance with an aspect of the present invention.

FIG. 3 illustrates a block diagram of an exemplary receiver 60 in accordance with an aspect of the present invention. The receiver 60 includes both transmit and receive functions for reception of cell phone signals and wireless relay to the control unit. The receiver 60 includes an antenna array 62 coupled to a transceiver 64. The transceiver 64 can include algorithms for demodulation of received data and modulation of transmitted data. The antenna array 62 and transceiver 64 cooperate to transmit and receive radio transmission signals to and from the receiver 60. Signals received by the receiver 60 are transmitted through the antenna array 62 and transceiver 64 to an A/D converter 68. The A/D converter 68 transforms the radio signal from the analog to the digital domain. The digital data is then provided to a digital preprocessor 70. Signals transmitted from the receiver 60 are transformed from the digital domain to the analog domain by a digital-to-analog (D/A) converter 68. The digital preprocessor 70 provides filtering and processing of the digitized signals. The digital preprocessor 70 then provides the digitized data to a signal separator component 72. The signal separator component 72 removes interfering signals within the same frequency band as desired cell phone signals. The interfering signals can include other cell phone signals within and around the rescue area in addition to other interfering signals within the same frequency and/or time slot.

The signal separator 72 then provides a direction finder component 74 with the desired signals. The direction finder component 74 can be combined with the signal separator component 72 such as in the TRW eCURE Firestorm algorithm, or be a separate component from the signal separator component 72. The direction finder component 74 can be a plurality of different signal direction finding algorithms, such as, for example, phase interferometry, pseudo-doppler, or super-resolution algorithms (e.g., MUSIC, MODE, WFA, Firestorm eCURE). The direction finder routine employs directional antennas located on the antenna array 62 to determine the direction which a transmitting signal originates.

The raw signal data and the direction finder data is provided to a digital postprocessor 76. The digital postprocessor 76 processes the raw signal data and direction finder data for transmitting to a master control unit. The post processed raw signal data and direction finder data are converted into the analog domain by the D/A converter 68 and transmitted through the transceiver 64 and antenna array 62 to a master control unit. The receiver 60 also includes a receiver position locator 78. The receiver position locator 78 determines the geographical position of the receiver with respect to the base station and other receivers in the rescue area. The receiver position locator can be based on differential GPS, non-GPS radio signal measurements, a laser ranger finder, or some other location device or method.

Figure 4:
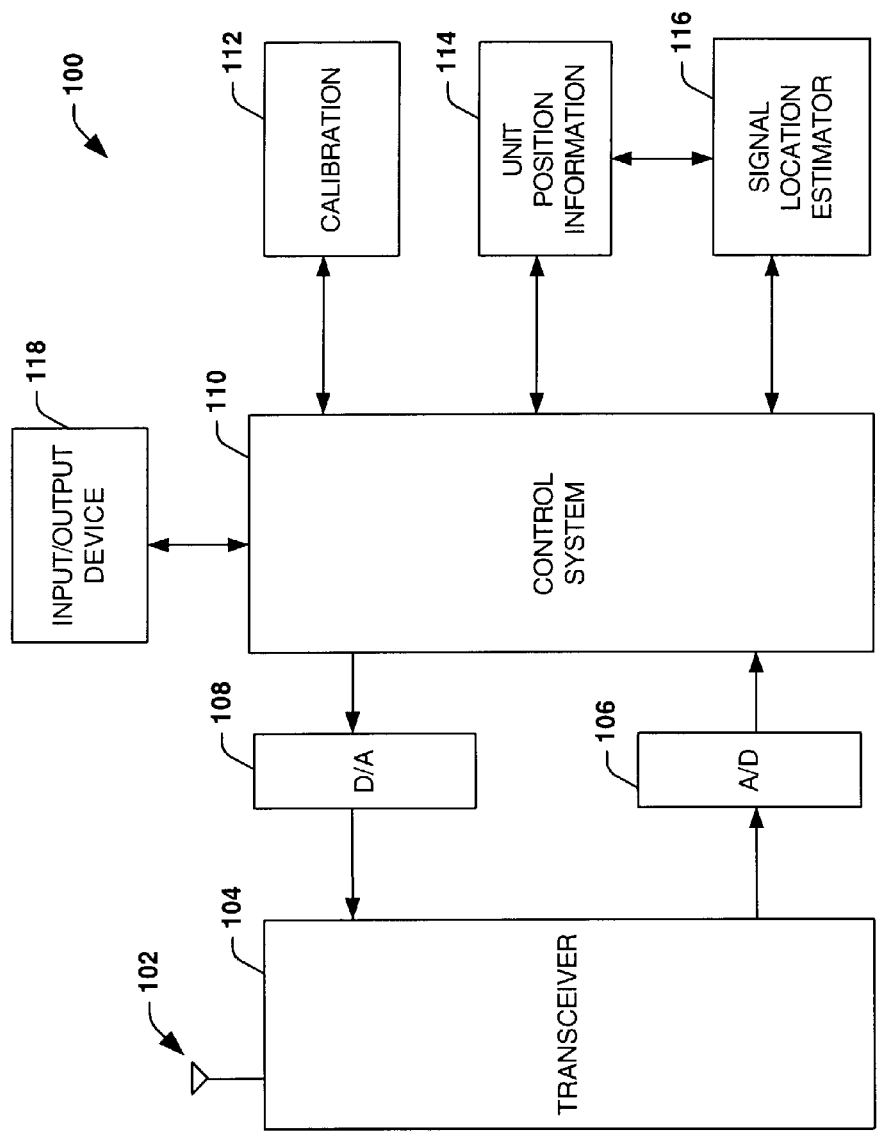
FIG. 4 illustrates a block diagram of a master control unit in accordance with an aspect of the present invention.

FIG. 4 illustrates a block diagram of a master control unit 100 in accordance with an aspect of the present invention. The master control unit 100 includes an antenna 102 coupled to a transceiver 104. The transceiver 104 can include algorithms for demodulation of received data and modulation of transmitted data. The antenna 102 and transceiver 104 cooperate to transmit and receive radio transmission signals to and from the base station and receivers. Signals received by the master control unit 100 are transmitted through the antenna 102 and transceiver 104 to an analog-to-digital (A/D) converter 106. The A/D converter 106 transforms the radio signals from the analog to the digital domain prior to providing the radio signal to a control system 110. Signals transmitted from the master control unit 100 originate from the control system 110 and are transformed from the digital domain to the analog domain by a digital-to-analog (D/A) converter 108. The control system 110 can include a processor or controller with corresponding memory for executing algorithms, or be a digital signal processor (DSP) with associated peripheral circuitry for executing algorithms. The algorithms can include calibration routine invocation 112 and unit geographical position information storage 114 of the base station and receivers and a signal locator estimator routine 116.

An input/output device 118 is coupled to the control system 110. The input/output device 118 provides for user control of the location system including invocation of the calibration routine 112, which causes execution of a position location routine for the units of the location system. The position location routine can be manually overridden by the user such that geographical position information can be provided for units that cannot be located automatically, such as those out of the line-of-sight, or underground or inside a rescue area. The input/output device 118 is also provided with output information such as radio transmission signal locations and device position information.

The control system 110 initiates the calibration routine 112 that causes commands to be transmitted through the D/A converter 108 and transmitted to other devices through the transceiver 104 and the antenna 102. The master control unit 100 then stores unit position information received from the receivers and/or bases station. Raw signal data and direction finding data are then received by the master controller unit 100. The signal location estimator 116 provides an estimate of transmission signals of radio transmission device (e.g., cell phones) in the rescue area employing the direction finding data, the raw signal data and the unit geographical position information 114. The signal location estimator 116 can employ a variety of different trilateration and/or triangulation routines that provides an estimate of the transmission location of one or more radio transmission signals. The estimates are then provided to the input/output device 118 for display to the user.

Figure 5:
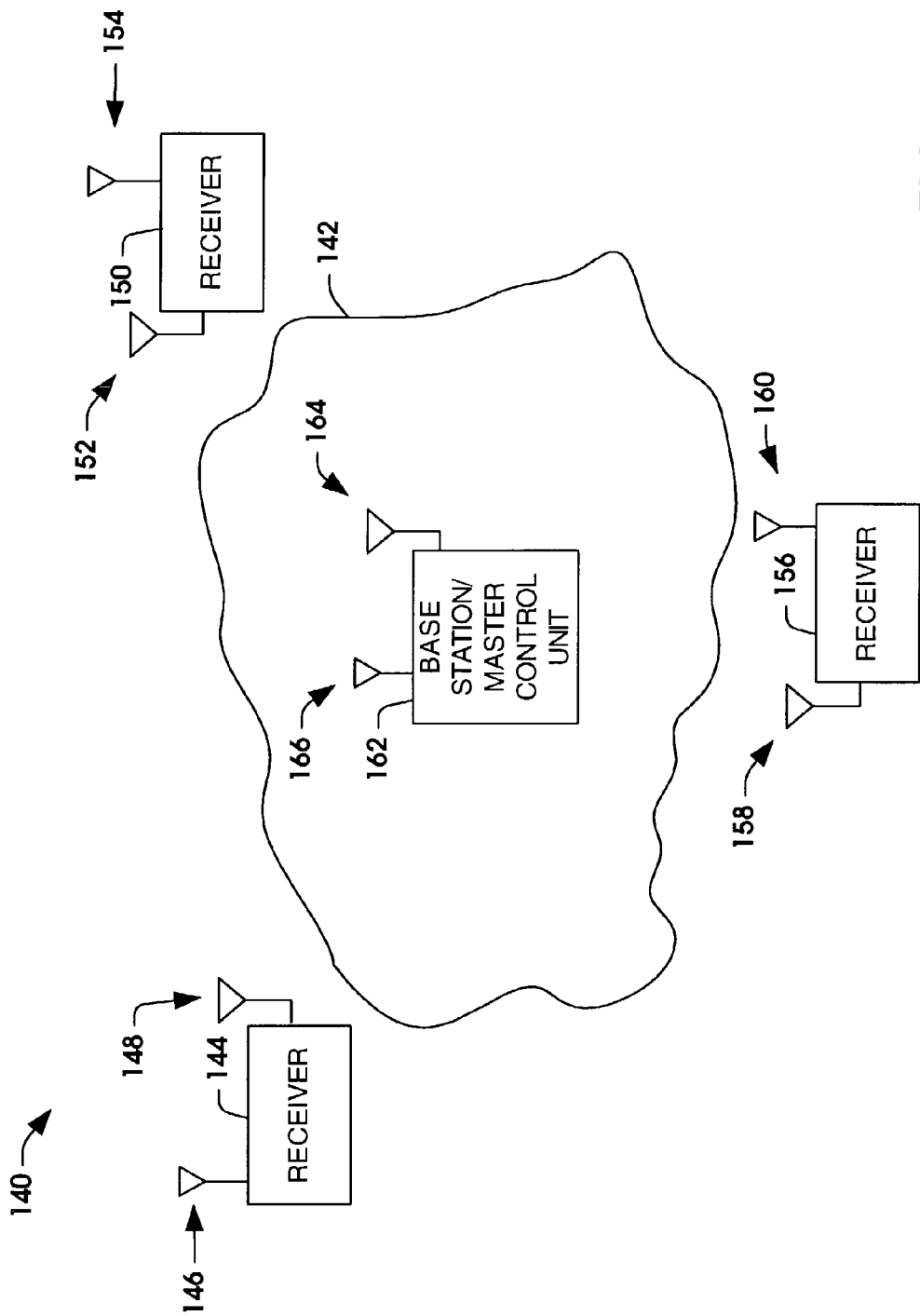
FIG. 5 illustrates a block diagram of an alternate transmission signal location system in accordance with an aspect of the present invention.

It is to be appreciated that the location determination functionality associated with the receivers, the base station and the master control unit can be combined. Additionally, different location determination techniques can be employed in accordance with the present invention. FIG. 5 illustrates an alternate transmission signal location system 140 in accordance with an aspect of the present invention. The transmission signal location system 140 includes a combination base station/master control unit 162 and a plurality of slave receiver devices 144. The combination base station/master control unit 162 includes an antenna 166. In the present example, a first receiver 144, a second receiver 150 and a third receiver 156 are positioned around a rescue area 142. The first receiver 144 includes an antenna 148, the second receiver 150 includes an antenna 152, and the third receiver 156 includes an antenna 158. The antennas 148, 152 and 158 can be directional antennas, such as a yagi directional antenna or dish antenna directed at the rescue area 142. The first receiver 144 also includes a GPS antenna 146, the second receiver 150 includes a GPS antenna 154, and the third receiver 156 includes a GPS antenna 160. Additionally, the combination base station/master control unit 162 includes a GPS antenna 166. The GPS antennas 146, 154, 160 and 166 are employed by the respective devices to determine geographical position with respect to one another. Other geographical position determination techniques (e.g., laser range finding) can be substituted or combined with the GPS positioning technique.

The combination base station/master control unit 162 is located within the rescue area 142 and operative to initiate the system 140, extract geographical position information from the receivers, transmit pilot signals, and receive and process transmission signals detected within the rescue area 142. The receivers 144, 150 and 156 are disposed around the rescue area 142, for example, in a triangular configuration. Alternatively, the receivers 144, 150 and 156 can be placed within the rescue area 142 and/or a combination of within and around the rescue area 142 based on the terrain limitations of the rescue area 142.

The combination base station/master control unit 162 transmits a plurality of pilot signals in the direction of the rescue area 142. The pilot signals are employed to simulate a cell tower connection to a cell phone, or to transfer control from a connected cell tower to the combination base station/master control unit 162. The combination base station/master control unit 162 will transmit a plurality of frequency band signals for a plurality of air-interface standards. In one aspect of the invention, the combination base station/master control unit 162 includes a software defined radio. The combination base station/master control unit 162 can command a cell phone to handoff to different frequencies. The phone can be stepped through the band by means of a series of handoffs as previously described. The frequencies of all desired phone types can be transmitted in frequency sets so as to transmit all desired phone frequencies within a desirable time limit.

The receivers 144, 150 and 156 monitor transmission signal responses to the pilot signals as the pilot signals are being transmitted. The receivers 144, 150 and 156 transmit the received signals to the combination base station/master control unit 162. The combination base station/master control unit 162 performs a cochannel separation routine to separate the desired signals from interfering signals. The interfering signals can include other cell phone signals within and around the rescue area in addition to other interfering radio signals within the same frequency and/or time slot in and outside the rescue area 142. The signal separation routine can be a number of different signal separation routines. The combination base station/master control unit 162 employs the data from each receiver to perform a triangulation or trilateration routine. For example, the combination base station/master control unit 162 can employ a time-difference-of-arrival (TDOA) routine to determine an estimated location of one or more cell phones in the rescue area. The rescue workers can then search the area (e.g., dig into the rubble at the estimated location) until the signal transmitter is located. If the signal transmitter is not located, the combination base station/master control unit 162 and/or receivers 144, 150 and 156 can be moved around the rescue area 142 and the location estimation can be repeated.

Figure 6:
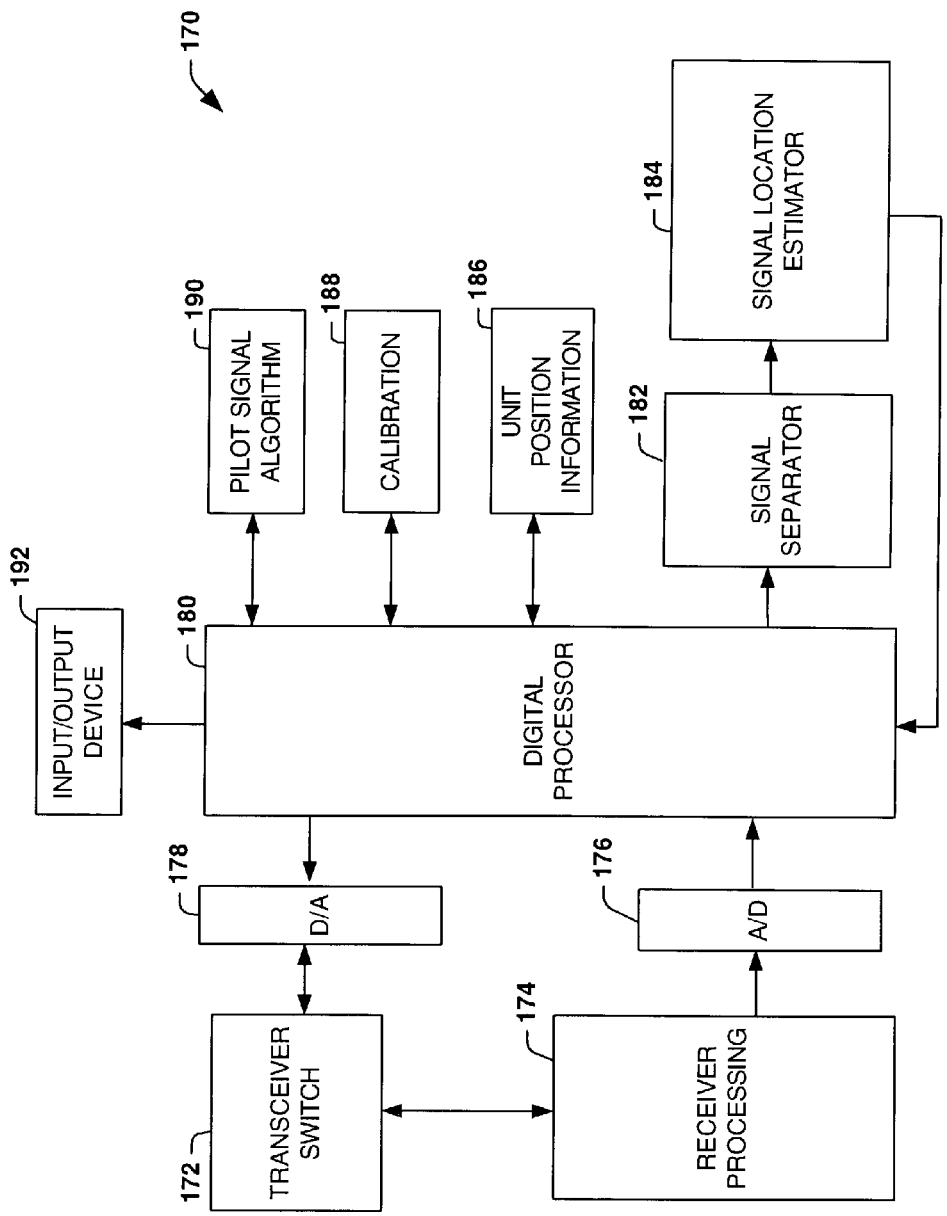
FIG. 6 illustrates a functional block diagram of a combination base station/master controller in accordance with an aspect of the present invention.

FIG. 6 illustrates a block diagram of a combination base station/master control unit 170 in accordance with an aspect of the present invention. The combination base station/master control unit 170 includes an antenna 172 coupled to a transceiver 174. The transceiver 174 can include algorithms for demodulation of received data and modulation of transmitted data. The antenna 172 and transceiver 174 cooperate to transmit and receive radio transmission signals to and from the combination base station/master control unit 170. Signals received by the combination base station/master control unit 170 are transmitted through the antenna 172 and transceiver 174 to an A/D converter 176. The A/D converter 176 transforms the radio signals from the analog to the digital domain prior to providing the radio signal to a digital processor 180. Signals transmitted from the combination base station/master control unit 170 originate from the digital processor 180 and are transformed from the digital domain to the analog domain by a D/A converter 178.

The combination base station/master control unit 170 initiates a calibration routine 188. The calibration routine 188 initializes the location system in addition to invoking a geographically position location routine. The position location routine determines geographical locations of the receivers with respect to one another. The geographical location information is received by the combination base station/master control unit 170 and stored as unit position information 186. The unit position information 186 is employed to determine the position location of one or more radio transmission signals in a rescue area.

The combination base station/master control unit 170 employs a pilot signal algorithm 190 to transmit pilot signals in frequency bands of a variety of air-interface standards. For example, the present invention may be adapted for, but is not limited to, any of the common wireless standards, such as AMPS, NAMPS, NMT 900, TACS, ETACS, NMT 450, C-450, RTMS, JTACS, NTACS, DAMPS (TDMA, IS-54, IS-136), GSM, DCS 1800, PCS (PCS 1800 and PCS 1900), PHS, CDMA (narrowbands, widebands, 800 MHz, 1.8 GHz or 1.9 GHz), iDEN (aka MIRS), EDACS, FHMA, JDC, TETRA, APCO-25, and MPT-1327. The combination base station/master control unit 170 illuminates the rescue area with strong pilot signals so that cell phones within the cell phone area will connect to the base station transferring signal lock and control away from local commercial service. The combination base station/master control unit 170 can support all air-interface standards concurrently. The pilot signal algorithm 190 steps through the frequency bands of each standard, so as to transmit all frequencies of all desired phone types within a desirable time limit.

The combination base station/master control unit 170 receives signals from one or more receivers and provides the signals to a signal separator component 182 that removes interfering signals within the same frequency band as the desired cell phone signals. The interfering signals can include other cell phone signals within and around the rescue area in addition to other interfering signals within the same frequency and/or time slot. The signal separator component 182 provides raw data signals to a signal location estimator (SLE) component 184. The signal separator 182 can also provide direction finding data to the signal location estimator component 184.

The SLE component 184 can be one of a variety of different techniques for estimating transmission signal locations in a wireless system based on triangulation, trilateration or time-difference-of-arrival (TDOA) measurements. TDOA involves measuring the difference in arrival time of signals transmitted to or from different locations in the system. The signal arrival time information is processed using known relationships to derive an estimate of a mobile transmission location. Three receivers are generally required in order to estimate mobile location in three dimensions. Differential range values may be computed by multiplying the TDOA differential path delay measurements by the speed of light in the medium, which is estimated if unknown, to provide an estimate of the differential distance between the mobile station and any pair of the three receivers. Each differential range defines a hyperbola having its foci at the corresponding receiving antennas, such that the mobile location may be estimated as the intersection of three hyperbolas associated with the three pairs of receivers. A two-dimensional mobile station location estimate can be generated by solving equations for the hyperbolas using differential range values computed for the first and second, first and third and second and third receivers. It is to be appreciated that a variety of signal location estimators can be employed in place of the time-difference of arrival (TDOA) component 184.

An input/output device 192 is coupled to the digital processor 180. The input/output device 180 provides for user control of the location system including invocation of the calibration routine 188, which causes execution of a geographical position location routine for the units of the location system. The position location routine can be manually overridden by the user such that units that cannot be located automatically, such as those out of the line-of-sight, or underground or inside a rescue area can be assigned with position information. The input/output device 192 is also provided with output information such as radio transmission signal locations and device position information. The radio transmission signal location information is determined employing the time-difference of arrival (TDOA) results along with the unit position information 186.

Figure 7:
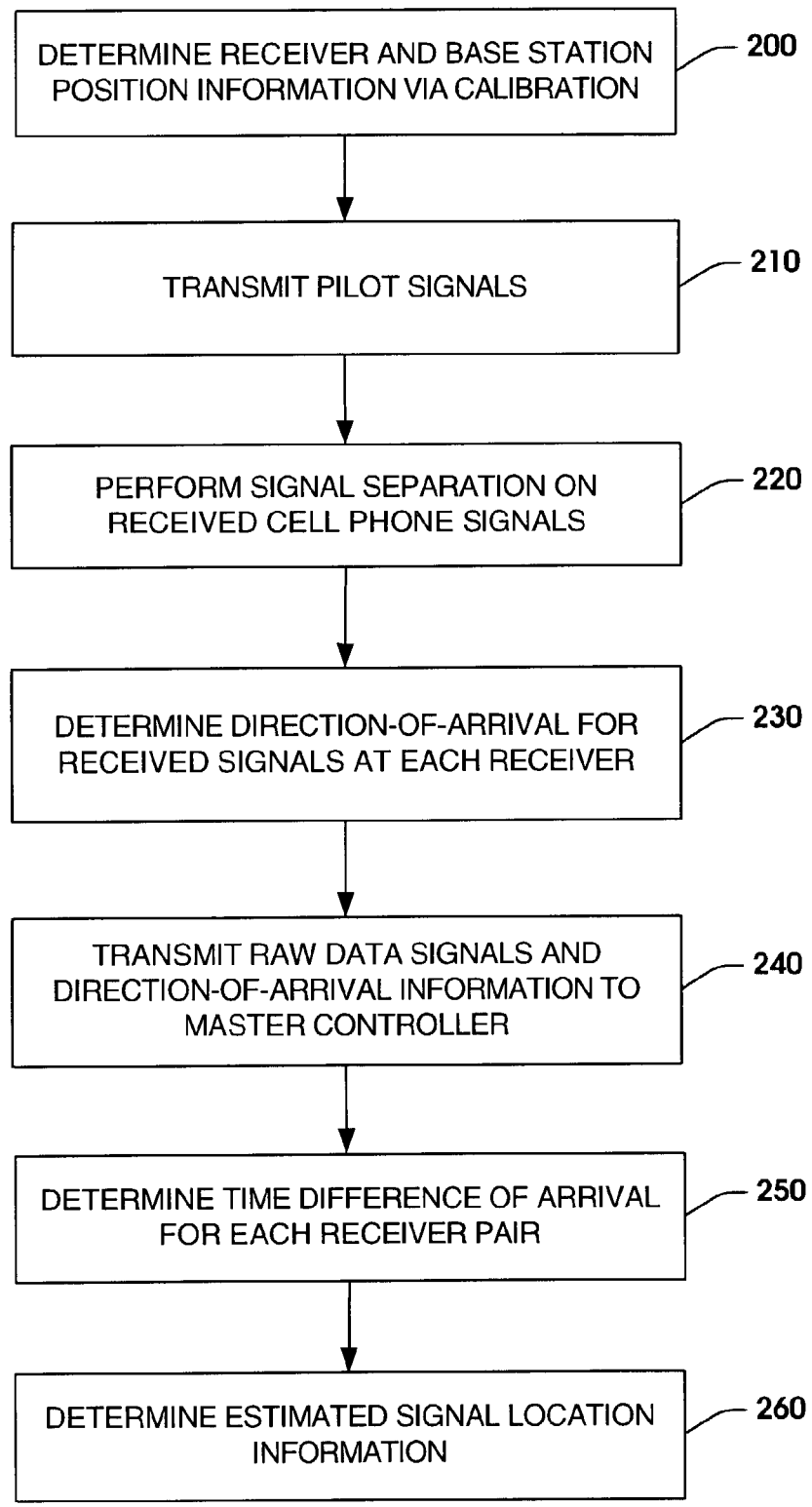
FIG. 7 illustrates a flow diagram of a methodology for locating a transmission signal in a rescue area in accordance with an aspect of the present invention.
Figure 8:
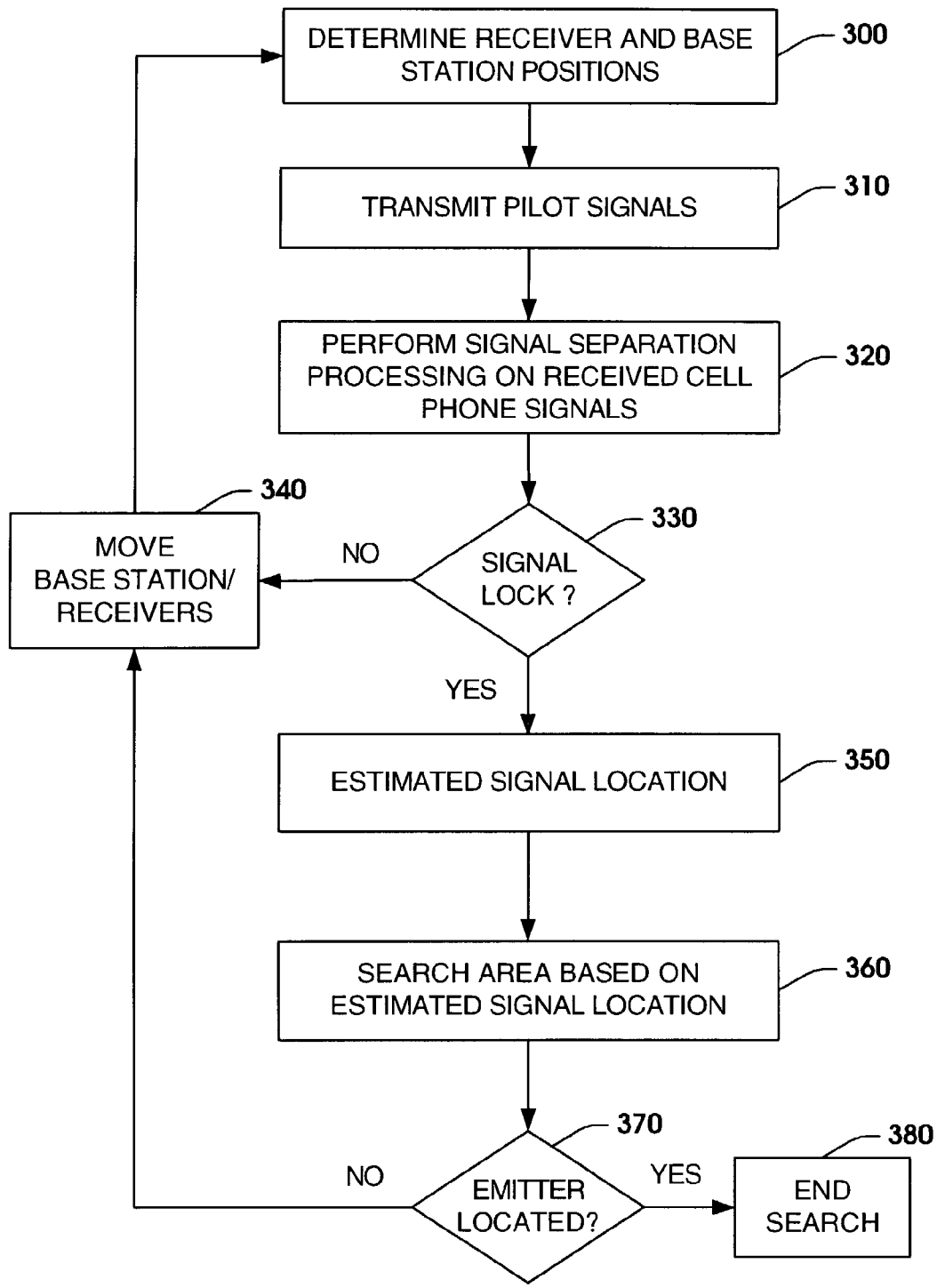
FIG. 8 illustrates a flow diagram of a methodology for performing a search and rescue operation in accordance with an aspect of the present invention.

In view of the foregoing structural and functional features described above, methodology in accordance with various aspects of the present invention will be better appreciated with reference to FIGS. 7–8. While, for purposes of simplicity of explanation, the methodology of FIGS. 7–8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates a methodology for locating a transmission signal in a rescue area in accordance with an aspect of the present invention. The methodology begins at 200 where geographical position information via calibration is determined for the base station and the receivers placed around or within a rescue area. The geographical location information can be determined employing GPS techniques, laser range finding techniques, or manual entry of the geographical location information. A variety of different techniques can be employed to determine the geographical location of the receivers and/or the base station. The methodology then proceeds to 210. At 210, the base station transmits a plurality of pilot signals in frequency bands of a variety of air-interface standards so that cell phones within the cell phone area can connect to, or transfer signal lock and control away from local commercial service. The pilot signals can include signals from any of the common wireless standards, such as AMPS, NAMPS, NMT 900, TACS, ETACS, NMT 450, C-450, RTMS, JTACS, NTACS, DAMPS (TDMA, IS-54, IS-136), GSM, DCS 1800, PCS (PCS 1800 and PCS 1900), PHS, CDMA (narrowbands, widebands, 800 MHz, 1.8 GHz or 1.9 GHz), iDEN (aka MIRS), EDACS, FHMA, JDC, TETRA, APCO-25, and MPT-1327. The frequency bands can be transmitted in sets of frequencies so as to transmit all frequencies of all desired phone types within a desirable time limit. The methodology then proceeds to 220.

At 220, a signal separation routine is performed on the received phone signals to separate the desired signals from interfering signals within the same frequency band and/or time slot. A variety of separation routines can be employed to extract desired signals from interfering signals. The separation routines can be operative to compensate for multipath effects of the received signals. For example, a cochannel signal processing technique such as TRW Firestorm eCURE algorithm can be employed. The TRW Firestorm eCURE algorithm compensates for multipath effects of transmitted signals and includes direction finding algorithms if employed with a directional antenna array and calibration information associated with the directional antenna array. Other signal separation routines can be employed that do not include direction finding algorithms. At 230, direction of arrival (DOA) information is determined for desired signals received at each receiver. A variety of different techniques can be employed to determine the direction of arrival (DOA) information. For example, smart antenna processing can be employed to determine a direction of the signal being received at one or more receivers by employing direction finding techniques, such as phase interferometry, pseudo Doppler, or super-resolution algorithm (e.g., MUSIC, MODE, WFA, Firestorm, eCURE). The methodology then proceeds to 240.

At 240, raw data signals and direction of arrival (DOA) information is transmitted to a master controller from one or more receivers. Alternatively, the raw data signals and direction of arrival (DOA) information can be transmitted to a master receiver. At 250, time difference of arrival (TDOA) information is determined for each receiver pair employing the raw data signals and the direction of arrival (DOA) information. The methodology then proceeds to 260. At 260, estimated signal transmission location information is determined employing the raw data signals and the direction of arrival (DOA) information. A variety of emitter location techniques can be employed to provide the estimated signal location information as alternatives to TDOA.

FIG. 8 illustrates a methodology for performing a search and rescue operation in accordance with an aspect of the present invention. The methodology begins at 300 where geographical position location information is determined for receivers placed around or within a rescue area, and the base station. The geographical position information can be determined employing GPS techniques, laser range finding techniques, or manual entry of the geographical location information. A variety of different techniques can be employed to determine the geographical location of the receivers and/or the base station. The methodology then proceeds to 310. At 310, the base station transmits a plurality of pilot signals at the rescue area. The plurality of pilot signals include transmitting signals in frequency bands of a variety of air-interface standards, so that cell phones within the cell phone area can connect to, or transferring signal lock and control away from local commercial service. The frequency bands can be transmitted in sets of frequencies so as to transmit all frequencies of all desired phone types within a desirable time limit. The methodology then proceeds to 320.

At 320, signal separation is performed on the received phone signals to separate the desired signals from interfering signals within the same frequency band and/or time slot. A variety of separation routines can be employed to extract desired signals from interfering signals. The separation routines can be operative to compensate for multipath effects of the received signals. The methodology then advances to 330.

At 330, the methodology determines if a signal lock with one or more cell phones within the rescue area has occurred. A signal lock is defined as a phone registering itself with the base station pursuant to its wireless standard. If a signal lock with one or more cell phones with the rescue area has not occurred (NO), the methodology proceeds to 340. At 340, the base station and/or receivers are moved around the rescue area. The methodology then returns to 300 to repeat the process of determining receiver and/or base station geographical position information. If a signal lock with one or more cell phones with the rescue area has occurred (YES), the methodology advances to 350 to process the received signals. At 350, the received signal location is estimated. The received signal location can be estimated employing one or more location techniques. For example, smart antenna processing can be employed to determine a direction of the signal being received at one or more receivers by employing direction finding techniques, such as direction-of-arrival (DOA) techniques. Additionally, triangulation, trilateration, or time difference of arrival (TDOA) techniques can be employed to estimate the signal location. The methodology then proceeds to 360.

At 360, a search of the area is performed based on the estimated signal location. For example, in a building collapse application, digging can be performed in the area at which the location signal estimate has been determined. The methodology then proceeds to 370 to determine if the emitter or emitters of the transmitted signal or signals have been located. If the emitter or emitters of the transmitted signal or signals have not been located (NO), the methodology returns to 340. At 340, the base station and/or receivers are repositioned and the methodology returns to 300 to repeat the process of determining receiver and/or base station geographical position information. If the emitter or emitters of the transmitted signal or signals have been located (YES), the methodology advances to 380 and the search is ended.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A transmission signal location system for locating at least one emitter device in a rescue area, the system comprising:
   a base station that transmits a plurality of pilot signals by stepping through pilot signal frequency bands of a given common wireless standard for each of a plurality of common wireless standards to lock onto an emitter within a rescue area;
   a plurality of receivers operative to receive transmission signals from at least one emitter device within the rescue area, the emitter device signals being separated from other interfering signals within the same frequency band; and
   a master device that determines an estimated location of the at least one emitter device within the rescue area.

2. The system of claim 1, the plurality of receivers employ a cochannel signal processing routine that separates emitter device signals from other interfering signals within the same frequency band.

3. The system of claim 1, the plurality of common wireless standards comprising at least two of AMPS, NAMPS, NMT 900, TACS, ETACS, NMT 450, C-450, RTMS, JTACS, NTACS, DAMPS (TDMA, IS-54, IS-136), GSM, DCS 1800, PCS (PCS 1800 and PCS 1900), PHS, CDMA (narrowbands, widebands, 800 MHz, 1.8 GHz or 1.9 GHz), iDEN, EDACS, FHMA, JDC, TETRA, APCO-25, and MPT-1327.

4. The system of claim 1, the base station transmitting pilot signals in sets of frequencies, so as to transmit all frequencies of the plurality of common wireless standards within a desirable time limit.

5. The system of claim 1, at least one of the plurality of receivers having an antenna array that cooperates with a direction finding routine to determine a direction of an emitter transmission signal within the rescue area.

6. The system of claim 5, the master device comprising a master control unit that receives the separated emitter device signals and direction-of-arrival (DOA) information from the plurality of receivers and determines an estimated location of the at least one emitter device within the rescue area based on a time-difference-of-arrival (TDOA) technique.

7. The system of claim 1, the master device comprising a master control unit that receives the separated emitter device signals from the plurality of receivers and determines an estimated location of the at least one emitter device within the rescue area based on a time-difference-of-arrival (TDOA) technique.

8. The system of claim 1, the master device invokes a calibration routine that initiates a geographical position routine that determines geographical position information associated with the plurality of receivers.

9. The system of claim 8, the geographical position information being utilized in conjunction with the separated emitter device signals from the plurality of receivers to determine an estimated location of the at least one emitter device within the rescue area.

10. The system of claim 8, the geographical position information being determined employing one of a Global Positioning System (GPS) technique, a laser range finder technique and a manual entry technique.

11. The system of claim 1, the master device being a master receiver device.

12. The system of claim 1, the base station and master device being integrated into a single integrated unit.

13. The system of claim 1, master device executing one of a triangulation and trilateration technique to determine an estimated location of the at least one emitter device, as a minimum, or higher order location determining techniques.

14. A method for locating a transmission signal in a rescue area, the method comprising:
   locating a plurality of receivers around a rescue area;
   determining geographical position information associated with the plurality of receivers;
   transmitting a plurality of pilot signals toward the rescue area;

monitoring for transmission signals from at least one emitter device within the rescue area;

transmitting a plurality of frequency handoff commands to the at least one emitter device within the rescue area to step the at least one emitter device through a plurality of frequency bands of a given common wireless standard;

separating emitter device signals within the rescue area from other interfering signals within the same frequency band; and determining an estimated location of the at least one emitter device within the rescue area.

15. The method of claim 14, further comprising conducting a search for the at least one emitter device in the rescue area based on the estimated location.

16. The method of claim 15, further comprising relocating the plurality of receivers around the rescue area if the at least one emitter device is not located and repeating the determining an estimated location of the at least one emitter device.

17. The method of claim 14, the determining geographical position information associated with the plurality of receivers comprising performing one of a GPS location technique, a laser range finding technique and a manual entry technique to determine the geographical position of the plurality of receivers.

18. The method of claim 14, the transmitting a plurality of pilot signals toward the rescue area comprising transmitting pilot signals by stepping through pilot signal frequency bands of a given common wireless standard for each of a plurality of common wireless standards to lock onto an emitter within a rescue area.

19. The method of claim 14, the transmitting a plurality of pilot signals comprising transmitting pilot signals in sets of frequencies, so as to transmit substantially all frequencies of the plurality of common wireless standards within a desirable time limit.

20. The method of claim 14, the separating emitter device signals within the rescue area from other interfering signals within the same frequency band comprising performing a cochannel processing algorithm on the received signals.

21. The method of claim 14, the determining an estimated location of the at least one emitter device within the rescue area comprising executing a direction-of-arrival-technique (DOA) at the plurality of receivers and employing direction finding data and raw signal data in performing a time-difference-of-arrival (TDOA) technique to estimate the location of the at least one emitter device.

22. A system for locating a transmission signal in a rescue area, the system comprising:

means for determining geographical positions of a plurality of receivers placed in a rescue area;

means for transmitting a plurality of pilot signals in sets of frequencies, so as to transmit substantially all frequencies of a plurality of common wireless standards within a desirable time limit, in the rescue area to connect to at least one emitter device;

means for separating emitter device signals within the rescue area from other interfering signals within the same frequency band;

means for determining a direction of emitter device signals at each of the plurality of receivers; and means for estimating a location of the at least one emitter device within the rescue area employing direction data, raw signal data of emitter device transmission signals and geographical position data of the plurality of receivers.

23. The system of claim 22, the means for transmitting a plurality of pilot signals transmitting a plurality of pilot signals in sets of frequencies of a plurality of frequency bands in a plurality of common wireless standards.

24. The system of claim 22, the means for separating emitter device signals comprising a cochannel processing algorithm.

* * * * *